(12) United States Patent
Bensason et al.

(10) Patent No.: US 10,293,575 B2
(45) Date of Patent: May 21, 2019

(54) PROCESS FOR PRODUCING ULTRASONIC SEAL, AND FILM STRUCTURES AND FLEXIBLE CONTAINERS WITH SAME

(71) Applicant: Dow Global Technologies LLC, Midland, MI (US)

(72) Inventors: Selim Bensason, Rueschlikon (CH); Jozef J. Van Dun, Horgen (CH); Gagan Saini, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 655 days.

(21) Appl. No.: 14/776,862

(22) PCT Filed: Apr. 9, 2014

(86) PCT No.: PCT/US2014/033427
§ 371 (c)(1),
(2) Date: Sep. 15, 2015

(87) PCT Pub. No.: WO2014/169005
PCT Pub. Date: Oct. 16, 2014

(65) Prior Publication Data
US 2016/0039178 A1 Feb. 11, 2016

Related U.S. Application Data

(60) Provisional application No. 61/810,123, filed on Apr. 9, 2013.

(51) Int. Cl.
*B32B 7/12* (2006.01)
*B32B 27/32* (2006.01)
(Continued)

(52) U.S. Cl.
CPC .............. *B32B 7/12* (2013.01); *B29C 65/08* (2013.01); *B29C 65/8207* (2013.01);
(Continued)

(58) Field of Classification Search
CPC ............ B32B 7/12; B32B 27/32; B32B 27/08; B32B 27/36; B32B 37/06; B32B 27/34;
(Continued)

(56) References Cited

U.S. PATENT DOCUMENTS 5,984,088 A 11/1999 Dietz et al.
2004/0142130 A1* 7/2004 Capasso .............. B29C 66/1122
428/35.7
(Continued)

FOREIGN PATENT DOCUMENTS

EP 1837162 A1 9/2007
JP 2000-117834 A 4/2000
(Continued)

OTHER PUBLICATIONS

McKeen (McKeen, "Film properties of plastics and elastomers", third edition, 2012, Elsevier, Chapter 9, Polyolefins, p. 189-217).*

*Primary Examiner* — Gerard Higgins
*Assistant Examiner* — Kevin C Ortman, Jr.
(74) *Attorney, Agent, or Firm* — Husch Blackwell LLP (57) ABSTRACT

The present disclosure is directed to processes for producing ultrasonic sealable film structures and flexible containers with ultrasonic seals. The film structure includes a first multilayer film and a second multilayer film. Each multilayer film includes a backing layer and a seal layer. Each seal layer includes an ultrasonic sealable olefin-based polymer (USOP) having the following properties: (a) a heat of melting, ΔHm, less than 130 J/g, (b) a peak melting temperature, Tm, less than 125° C., (c) a storage modulus in shear (G') from 50 MPa to 500 MPa, and (d) a loss modulus in shear (G") greater than 10 MPa. The multilayer films are arranged such that the seal layer of the first multilayer film is in contact with the seal layer of the second multilayer film. The seal layers form an ultrasonic seal having a seal strength (Continued)

from 30 N/15 mm to 80 N/15 mm when ultrasonically sealed at 4 N/mm seal force.

7 Claims, 8 Drawing Sheets

(51) Int. Cl.
    *B32B 15/08*     (2006.01)
    *B32B 27/08*     (2006.01)
    *B32B 27/34*     (2006.01)
    *B32B 37/06*     (2006.01)
    *B32B 27/36*     (2006.01)
    *B29C 65/08*     (2006.01)
    *B29C 65/82*     (2006.01)
    *B29C 65/00*     (2006.01)

(52) U.S. Cl.
    CPC ........ *B29C 66/112* (2013.01); *B29C 66/1122* (2013.01); *B29C 66/133* (2013.01); *B29C 66/135* (2013.01); *B29C 66/431* (2013.01); *B29C 66/723* (2013.01); *B29C 66/731* (2013.01); *B29C 66/73115* (2013.01); *B29C 66/73921* (2013.01); *B29C 66/8322* (2013.01); *B29C 66/9292* (2013.01); *B29C 66/92431* (2013.01); *B32B 15/08* (2013.01); *B32B 27/08* (2013.01); *B32B 27/32* (2013.01); *B32B 27/34* (2013.01); *B32B 27/36* (2013.01); *B32B 37/06* (2013.01); *B29C 66/71* (2013.01); *B29C 66/7234* (2013.01); *B29C 66/72321* (2013.01); *B29C 66/73711* (2013.01); *B29C 66/73713* (2013.01); *B29C 66/9512* (2013.01); *B29C 66/9513* (2013.01); *B29C 66/9516* (2013.01); *B32B 2307/31* (2013.01); *B32B 2439/00* (2013.01)

(58) Field of Classification Search
    CPC . B32B 15/08; B32B 2307/31; B32B 2439/00; B29C 66/723; B29C 66/112; B29C 66/9292; B29C 66/92431; B29C 66/8322; B29C 66/731; B29C 66/73921; B29C 65/08; B29C 65/8207; B29C 66/73115; B29C 66/1122; B29C 66/133; B29C 66/135; B29C 66/431; B29C 66/73713; B29C 66/73711; B29C 66/9512; B29C 66/9516; B29C 66/9513; B29C 66/71; B29C 66/7234; B29C 66/72321
    USPC ...... 428/523, 500, 480, 35.7, 515, 220, 516, 428/349, 336, 461, 458, 910, 195.1, 428/411.1, 474.4, 483, 457, 339, 354, 428/35.2, 212, 213, 522, 141, 702, 218, 428/337, 423.1, 216, 323, 327, 476.9, 428/520, 521, 209, 215, 304.4, 315.5, 428/344, 35.4, 41.3, 43, 447, 475.8, 200, 428/317.3, 335, 347, 34.1, 40.1, 412, 446, 428/475.5, 518, 519, 328, 341, 355 EN, 428/36.92, 413, 424.2, 475.2, 476.1, 428/476.3, 517, 138, 219, 319.7, 319.9, 428/332, 343, 34.2, 34.3, 34.9, 355 AC, 428/35.3, 36.6, 36.7, 41.8, 448, 451, 428/473.5, 704, 137, 156, 203, 221, 428/317.1, 318.4, 324, 325, 32.11, 334, 428/34.8, 352, 35.9, 36.91, 409, 41.5, 428/41.7, 421, 425.1, 463, 481, 513, 688, 428/698, 119, 142, 157, 172, 182, 192, 428/1.5, 201, 206, 207, 211.1, 29, 314.8, 428/315.7, 317.7, 317.9, 318.8, 319.3, 428/326, 32.39, 32.6, 32.69, 32.75, 32.77, 428/330, 331, 340, 342, 355 BL, 355 R, 428/356, 35.8, 36.3, 36.5, 40.2, 40.3, 428/40.6, 414, 418, 41.4, 41.6, 41.9, 420, 428/422, 423.5, 423.7, 424.8, 425.8, 426, 428/42.1, 42.2, 450, 454, 459, 462, 474.9, 428/477.7, 479.3, 482, 484.1, 495, 501, 428/507, 511, 512, 532, 533, 534, 537.5, 428/549, 57, 626, 69, 71, 76, 78; 525/240, 222, 53, 55, 106, 107, 125, 178, 525/186, 191, 221, 232, 322, 329.9, 525/333.7, 382, 432, 449, 50, 57, 59, 61, 525/64, 66, 88, 90, 92 C, 93, 95; 264/173.16, 173.19, 129, 510, 173.14, 264/171.1, 173.15, 210.1, 259, 173.12, 264/173.11, 210.7, 291, 509, 83, 101, 264/132, 134, 160, 165, 172.12, 173.1, 264/173.18, 174.1, 176.1; 156/510, 535, 156/580, 64, 703, 709, 711, 719, 82, 92, 156/921; 383/211, 109, 113, 116, 94, 10, 383/103, 104, 105, 106, 107, 108, 123, 383/203, 207, 210.1, 44, 45, 59, 6, 61.3, 383/61.5, 64, 66, 906, 97
    See application file for complete search history.

(56) References Cited

U.S. PATENT DOCUMENTS

2009/0233025 A1*   9/2009   Cvancara ................ B29C 65/08
                                                                428/35.7
2010/0290723 A1* 11/2010   Shinozaki ............. B65D 75/12
                                                                 383/207
2013/0305664 A1   11/2013   Arroyo et al.

FOREIGN PATENT DOCUMENTS

JP       2007-137438 A     6/2007
JP       2009-039979 A     2/2009
JP         2011-31907 A     2/2011

* cited by examiner

Figure 1

A plot of G" vs G' at 10°C (10 rad/s) for a series of polymers

Figure 3A seams with layer step 2/4 layers

Figure 3B

Seal integrity across the fin seal

PROCESS FOR PRODUCING ULTRASONIC SEAL, AND FILM STRUCTURES AND FLEXIBLE CONTAINERS WITH SAME

FIELD

The present disclosure is directed to processes for producing ultrasonic sealable film structures and flexible containers with ultrasonic seals.

BACKGROUND

Compared to conventional heat sealing, utilization of ultrasonic sealing in flexible packaging, offers performance advantages such as the ability: (i) to seal through contamination, (ii) to form narrower seal zones, and (iii) to form seals at higher line speeds and at lower temperature environment. Packaging systems suitable for ultrasonic welding include vertical- or horizontal-form-fill-sealing. Despite these benefits, ultrasonic sealing has a significant drawback. Due to the contact geometry between the horn and the anvil and oscillatory deformation, ultrasonic sealing often leads to significant material outflow and squeeze-out of polymer away from the seal area. This "squeeze-out" phenomenon of ultrasonic sealing can cause damage, and eventual destruction of the laminate structure in the formed ultrasonic seal. Layer steps, i.e., step changes in the thickness of the material between the horn and anvil (such as in gussets and folds, and cross-section fin seals) are particularly susceptible to damage when ultrasonically sealed. Faulty sealing in these areas reduces seal strength (as measured by peeling tests), may destroy the laminate in the seal zone, and create channel leakers resulting in loss of barrier properties in packaging laminates with thin layers of aluminum or barrier polymers, such as ethylene vinylalcohol copolymers (EvOH).

Approaches proposed to mitigate the aforementioned problems include (i) optimization of the contact geometry, especially the energy director and (ii) control of horn displacement during sealing both of which are subject to limitations.

Careful selection of polymers and optimization of the multilayer structures offers an alternate route to mitigate the problems above. There is hence a need to identify polymers and structures that can be sealed ultrasonically and offer a seal strength comparable to that achievable by conventional heat sealing. A need further exists for an ultrasonic sealing process that increases ultrasonic seal strength. A need also exists for strengthened ultrasonic seals that overcome the shortcomings of contact geometry optimization or adjustment of seal force displacement. A need further exists for improved ultrasonic sealable films to meet the demand for more versatile uses of flexible containers.

SUMMARY

The present disclosure is directed to a process for producing ultrasonic seals, and film structures and flexible containers containing the ultrasonic seals. The present process includes a selection of polymers for ultrasonic sealing based on four factors that influence material flow in the ultrasonic seal area in addition to contact geometry optimization and seal force adjustment. In addition, the process includes tailoring the film composition and structure for further improvement of ultrasonic seal strength.

The present disclosure provides a process for producing an ultrasonic seal. The ultrasonic seal is formed between two polymeric films. The process includes preparing a multilayer film which has a backing layer and a seal layer. The seal layer includes an ultrasonic sealable olefin-based polymer (USOP). The USOP is selected based on the following properties:

(a) a heat of melting, $\Delta H_m$, less than 130 J/g,
(b) a peak melting temperature, $T_m$, less than 125° C.,
(c) a storage modulus in shear (G') from 50 MPa to 500 MPa, and
(d) a loss modulus in shear (G") greater than 10 MPa.

The process includes contacting the seal layer of a first multilayer film with the seal layer of a second multilayer film to form a seal area. The process includes subjecting the seal area to ultrasonic energy. The process includes forming an ultrasonic seal between the two seal layers, the ultrasonic seal having a seal strength from 30 N/mm to 80 N/mm.

The present disclosure provides a film structure. The film structure includes a first multilayer film and a second multilayer film. Each multilayer film includes a backing layer and a seal layer. Each seal layer includes an ultrasonic sealable olefin-based polymer (USOP) having the following properties:

(a) a heat of melting, $\Delta H_m$, less than 130 J/g,
(b) a peak melting temperature, $T_m$, less than 125° C.,
(c) a storage modulus in shear (G') from 50 MPa to 500 MPa, and
(d) a loss modulus in shear (G") greater than 10 MPa.

The multilayer films are arranged such that the seal layer of the first multilayer film is in contact with the seal layer of the second multilayer film. The seal layers form an ultrasonic seal having a seal strength from 30 N/15 mm to 80 N/15 mm when ultrasonically sealed at 4 N/mm seal force.

The present disclosure provides a flexible container. The flexible container includes a first multilayer film and a second multilayer film. Each multilayer film includes a backing layer and a seal layer. The seal layer includes an ultrasonic sealable olefin-based polymer (USOP) having the following properties:

(a) a heat of melting, $\Delta H_m$, less than 130 J/g,
(b) a peak melting temperature, $T_m$, less than 125° C.,
(c) a storage modulus in shear (G') from 50 MPa to 500 MPa, and
(d) a loss modulus in shear (G") greater than 10 MPa.

The multilayer films are arranged such that the seal layer of each multilayer film is in contact with each other and the second multilayer film is superimposed on the first multilayer film to form a common peripheral edge. The flexible container includes a 2-fold zone and a 4-fold zone. The 2-fold zone and the 4-fold zone each form an ultrasonic seal having a seal strength from 30 N/15 mm to 80 N/15 mm when the zones are ultrasonically sealed at 4 N/mm seal force.

DETAILED DESCRIPTION

The present disclosure provides a process for producing an ultrasonic seal. The ultrasonic seal is formed between two polymeric films. The process includes preparing a multilayer film which has a backing layer and a seal layer. The seal layer includes an ultrasonic sealable olefin-based polymer (USOP). The USOP is selected based on the following properties:

(a) a heat of melting, $\Delta H_m$, less than 130 J/g,
(b) a peak melting temperature, $T_m$, less than 125° C.
(c) a storage modulus in shear (G') from 50 MPa to 500 MPa, and
(d) a loss modulus in shear (G") greater than 10 MPa.

The process includes contacting the seal layer of a first multilayer film with the seal layer of a second multilayer film to form a seal area. The process includes subjecting the seal area to ultrasonic energy. The process includes forming an ultrasonic seal between the two seal layers, the ultrasonic seal having a seal strength from 30 N/mm to 80 N/mm.

The present process utilizes an ultrasonic sealing apparatus to produce an ultrasonic seal between two polymeric films. An ultrasonic sealing apparatus includes the following components.

(1) An anvil where films are placed to be contacted under pressure. The anvil allows high frequency vibration to be directed to the films in a seal area. The anvil includes an energy director which contacts one of the films.

(2) An ultrasonic stack including (a) a converter (converts electrical signal into a mechanical vibration), (b) a booster (modifies the amplitude of the vibration) and (c) a horn (applies the mechanical vibration to the parts to be welded or sealed). The horn is also referred to as a sonotrode. All three elements of the ultrasonic stack are tuned to resonate at the same ultrasonic frequency (typically from 15 kHz, 20 kHz, 30 kHz, 35 kHz, to 40 kHz or 70 kHz).

Subjecting the polymeric films to the ultrasonic energy causes local melting of the plastic due to absorption of vibration energy. The vibrations are introduced across the joint to be welded.

Ultrasonic sealing is distinct from, and excludes heat sealing. A heat sealing procedure includes hot metal sealing jaws that are moved from an open position to a closed position. In the closed position, the hot metal jaws come into direct contact with the outermost layers of a film for a period of time (dwell time), a predetermined sealing pressure, and a predetermined sealing temperature. During the dwell time, heat is transferred through the outermost layer of the film to melt and fuse opposing inner seal layers to form a heat seal. Generally, the outermost layer has a higher melting temperature than the seal layer. As such, while the seal layer is melted to form a seal, the outermost layer of the film does not melt and does not stick, or does not substantially stick, to the sealing jaws. Surface treatments to the sealing jaw bars may be applied to further reduce stickiness effects to the films. After the sealing jaws reopen, the film is cooled to room temperature.

In heat sealing, the opposing films are joined together via material interdiffusion at the interface, facilitated by conductive heat flow from the seal bars to the seal interface, whereby the temperature of the heat seal bars and dwell time are the key independent variables. In the case of semicrystalline polymer sealants like polyethylene for example, the heat seal bar temperature needs be set to at least at the temperature corresponding to the complete melting of the sealant, for the formation of a strong seal.

Conversely, in ultrasonic sealing the seal bars (horn and anvil pair) are typically at ambient temperature, and ultrasonic generation and flow are dependent variables that are governed by contact geometry, oscillation amplitude and frequency, static load and material selection. The ultrasonic energy necessary to achieve full melting at the interface is generated internally within the polymer. For a given frequency and contact geometry, the process variables influencing ultrasonic seal formation are the amplitude of the oscillations and the superimposed seal force applied through the horn. Elevated temperatures needed to facilitate ultrasonic sealing are generated internally, by partial dissipation of deformation energy into ultrasonic, as governed by viscoelastic characteristics of the polymer. The dissipated energy gives rise to an increase in temperature, the magnitude of which depends on the ultrasonic capacity of the system.

In conventional ultrasonic weld systems, the seal force translates the amplitude of the horn oscillations to oscillating deformation within the material and inadvertently leads to the gradual penetration of the anvil into the sealing zone. The profiled and hemispherical shape of the energy director extending into the seal area from the anvil further amplifies the stress concentration in the seal area, further exacerbating the problem of excessive material flow around the anvil.

For oscillatory deformation in the linear viscoelastic regime, the rate of ultrasonic generation per unit volume (per sinusoidal cycle of tensile deformation) is shown in Equation (I):

$$\dot{Q} = \pi f \varepsilon^2 E'' \tag{I}$$

where f is the frequency of oscillations,
ε is the deformation amplitude, and
E" is the loss modulus.

Equation (I) shows that the rate of ultrasonic generation is linearly proportional to loss modulus for a given amplitude and frequency of deformation, whereas the dependence on oscillation amplitude is to the second power. Direct application of Equation (I) to ultrasonic sealing is problematic because (i) the deformation is not homogenous, (ii) a substantial amount of the material in the seal area is non-isothermal, and (iii) the amplitude E in the above equation is not that of the horn, but that of the deformation applied to the material, which depends on the seal force which varies during the sealing cycle.

1. Backing Layer and Seal Layer

The process includes preparing a multilayer film. The multilayer film has a backing layer, a seal layer, and optional adhesive layer(s). Nonlimiting examples of suitable material for the backing layer include poly(ethylene terephthalate) (PET), polyamide, propylene-based polymer (such as biaxially oriented polypropylene or BOPP), and metal foil (such as aluminum foil).

The seal layer of the multilayer film includes an ultrasonic sealable olefin-based polymer (USOP).

In view of Equation (I) above, Applicant has developed parameters to determine whether a polymer is suited for ultrasonic sealing. First, based on scaling between ultrasonic generation rate and loss modulus, a polymer exhibiting a high loss modulus at the onset of horn oscillations is desired for rapid ultrasonicing.

Second, the square dependence of rate of ultrasonic generation on deformation amplitude suggests that polymers of lower rigidity are desired as this will allow a larger deformation amplitude to be realized in the polymer for a given seal force. Even though increasing the seal force on the horn may enhance the deformation amplitude in the polymer at the start of oscillations, a minimal seal force to produce an ultrasonic seal is desired to avoid squeezing of the polymer upon melting. Because the modulus of a semicrystalline polymer may drop more than two orders of magnitude upon melting, using a large seal force will lead to excessive squeezing of the melt from the seal zone. To ensure maximum ultrasonic generation with a minimal seal force, it is desired to select polymer with low modulus, so as to produce maximal amplitude of oscillations early on in the sealing cycle. Polymers with lower modulus at ambient conditions also have a smaller difference between solid and melt-state modulus—an additional factor that prevents excessive flow of material in the melt. Based on foregoing, at the onset of deformation, polymers featuring a high loss modulus combined with a low storage modulus are desired.

Third, the ultrasonic generated due to viscoelastic dissipation raises the temperature—thereby melting the semicrystalline at the interface, thereby allowing the formation of a strong seal. Polymers with lower ultrasonic of melting combined with a low temperature for complete melting are desired for rapid ultrasonic sealing characteristics. For such polymers the duration of oscillations necessary to transform the polymer into a melt, can be significantly short, hence a shorter cycle time.

Fourth, a polymer having a rapid relaxation time is desired to prevent solidification of a highly stressed melt which may be pushed out of the seal area. A rapid relaxation time may be obtained by one or more of the following factors, including a lower molecular weight, a narrow molecular weight distribution, and reduced or no long chain branching. The bead of squeezed-out polymer material forms the region of initial stress in a peeling geometry, therefore, strong adhesion of this bead to the surrounding material as well as lack of large frozen-in stresses are beneficial for high peel strength. Poor adhesion or regions with frozen-in orientation may provide paths of lower resistance to the initiation and propagation of a crack during a peel test.

Fifth, polyolefins with low molecular weight are desirable for improved caulkability i.e., the ability of the sealant to flow into gaps and around contaminants. Ultrasonic sealing is not limited by hot tack strength (as is heat sealing) because ultrasonic sealing utilizes cold sealing tools, which allow efficient cooling of the seal while in contact with the tools. Such cooling segment may be incorporated into the sealing cycle after the cessation of oscillations—hence allowing rapid buildup of hot tack strength and solidification of the polymer, much faster than what is feasible in conventional ultrasonic sealing.

Hence compositions with a combination of caulkability and packaging cycle time are enabled via the present ultrasonic sealing process. All things being equal, lower molecular weight polyolefins will perform better in ultrasonic sealing than high molecular weight polyolefins.

In view of the foregoing principles, the present process includes selecting an ultrasonic sealable olefin-based polymer for seal layer. An "ultrasonic sealable olefin-based polymer," (or USOP) as used herein, is an olefin-based polymer that forms a seal when subjected to ultrasonic energy and has each of the following properties:

(a) a heat of melting, $\Delta Hm$, less than 130 J/g and is measured by differential scanning calorimetry (DSC) as described herein;

(b) a peak melting temperature, $Tm$, less than 125° C. and is measured by the (DSC) method as described herein;

(c) a storage modulus in shear (G') at 10° C. from 50 MPa to 500 MPa, where G' is the in-phase component of the modulus measured by dynamic mechanical thermal analysis (DMTA) described herein; and (d) a loss modulus in shear (G") at 10° C. greater than 10 MPa, where G" is the out-of-phase component of the modulus measured by dynamic mechanical thermal analysis (DMTA) described herein.

In an embodiment, the USOP is an olefin-based polymer that forms a seal when subjected to ultrasonic energy and has each of the following properties:

(a) a heat of melting, $\Delta Hm$, from 50 J/g to less than 130 J/g;

(b) a peak melting temperature, $Tm$, greater than 90° C. to less than 125° C.;

(c) a storage modulus in shear (G') at 10° C. from 50 MPa to 350 MPa; and (d) a loss modulus in shear (G") from greater than 10 MPa to 40 MPa.

In an embodiment, the ultrasonic sealable olefin-based polymer is a propylene based plastomer or elastomer ("PBPE"). A "propylene-based plastomer or elastomer" (or "PBPE") comprises at least one copolymer with at least 50 weight percent of units derived from propylene and at least about 5 weight percent of units derived from a comonomer other than propylene. Such PBPE types of polymers are further described in U.S. Pat. Nos. 6,960,635 and 6,525,157, incorporated herein by reference. Such PBPE is commercially available from The Dow Chemical Company, under the tradename VERSIFY, or from ExxonMobil Chemical Company, under the tradename VISTAMAXX.

In an embodiment, the PBPE is further characterized as comprising (A) between 60 and less than 100, between 80 and 99, or between 85 and 99, wt % units derived from propylene, and (B) between greater than zero and 40, or between 1 and 20, 4 and 16, or between 4 and 15, wt % units derived from ethylene and optionally one or more $C_{4-10}$ ☐-olefin; and containing an average of at least 0.001, at least 0.005, or at least 0.01, long chain branches/1000 total carbons, wherein the term long chain branch refers to a chain length of at least one (1) carbon more than a short chain branch, and wherein short chain branch refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches in the propylene/ ethylene copolymer interpolymer does not exceed 3 long chain branches/1000 total carbons.

In an embodiment, the PBPE copolymer has a melt temperature (Tm) from 55° C. to less than 125° C.

A nonlimiting examples of suitable PBPE for the USOP include VERSIFY 2000 and VERSIFY 2200, available from The Dow Chemical Company.

In an embodiment, the ultrasonic sealable olefin-based polymer is a linear low density polyethylene. Linear low density polyethylene ("LLDPE") comprises, in polymerized form, a majority weight percent of units derived from ethylene, based on the total weight of the LLDPE. In an embodiment, the LLDPE is an interpolymer of ethylene and at least one ethylenically unsaturated comonomer. In one embodiment, the comonomer is a $C_3$-$C_{20}$ α-olefin. In another embodiment, the comonomer is a $C_3$-$C_8$ α-olefin. In another embodiment, the $C_3$-$C_8$ α-olefin is selected from propylene, 1-butene, 1-hexene, or 1-octene. In an embodiment, the LLDPE is selected from the following copolymers: ethylene/propylene copolymer, ethylene/butene copolymer, ethylene/hexene copolymer, and ethylene/octene copolymer. In a further embodiment, the LLDPE is an ethylene/octene copolymer.

In an embodiment, the LLDPE has a density in the range from 0.865 g/cc to 0.940 g/cc, or from 0.90 g/cc to 0.94 g/cc. The LLDPE has a melt index (MI) from 0.1 g/10 min to 10 g/10 min, or 0.5 g/10 min to 5 g/10 min.

LLDPE can be produced with Ziegler-Natta catalysts, or single-site catalysts, such as vanadium catalysts, constrained geometry catalysts, and metallocene catalysts. In an embodiment, the LLDPE is produced with a Ziegler-Natta type catalyst. LLDPE is linear and does not contain long chain branching and is different than low density polyethylene ("LDPE") which is branched or heterogeneously branched polyethylene. LDPE has a relatively large number of long chain branches extending from the main polymer backbone. LDPE can be prepared at high pressure using free radical initiators, and typically has a density from 0.915 g/cc to 0.940 g/cc.

In an embodiment, the LLDPE is a Ziegler-Natta catalyzed ethylene and octene copolymer and has a density from 0.90 g/cc to 0.93 g/cc, or 0.92 g/cc. Nonlimiting examples of suitable Ziegler-Natta catalyzed LLDPE are polymers sold under the tradename DOWLEX, available from The Dow Chemical Company, Midland, Mich.

A nonlimiting example of suitable LLDPE for the USOP includes DOWLEX 5056G available from The Dow Chemical Company.

In an embodiment, the ultrasonic sealable olefin-based polymer is an ultra low density polyethylene. Ultra low density polyethylene ("ULDPE") comprises, in polymerized form, a majority weight percent of units derived from ethylene, based on the total weight of the ULDPE. In an embodiment, the ULDPE is an interpolymer of ethylene and at least one ethylenically unsaturated comonomer. In one embodiment, the comonomer is a $C_3$-$C_{20}$ α-olefin. In another embodiment, the comonomer is a $C_3$-$C_8$ α-olefin. In another embodiment, the $C_3$-$C_8$ α-olefin is selected from propylene, 1-butene, 1-hexene, or 1-octene. In an embodiment, the ULDPE is selected from the following copolymers: ethylene/propylene copolymer, ethylene/butene copolymer, ethylene/hexene copolymer, and ethylene/octene copolymer. In a further embodiment, the ULDPE is an ethylene/octene copolymer.

In an embodiment, the ULDPE has a density in the range from 0.900 g/cc to 0.915 g/cc. The ULDPE has a melt index (MI) from 0.1 g/10 min to 10 g/10 min, or 0.5 g/10 min to 5 g/10 min.

A nonlimiting example of suitable ULDPE for the USOP includes ATTANE 4100 and ATTANE SL4102 available from The Dow Chemical Company.

In an embodiment, ultrasonic sealable olefin-based polymer is a polyolefin plastomer (or POP). A nonlimiting example of a suitable POP includes ethylene/octene plastomer such as AFFINITY PL 1881 G available from The Dow Chemical Company.

In an embodiment, the ultrasonic sealable olefin-based polymer is an ethylene/acrylic acid copolymer (or EAA). A nonlimiting example of a suitable ethylene/acrylic acid copolymer is PRIMACOR 1410 available from The Dow Chemical Company.

In an embodiment, the USPO is a polybutene.

In an embodiment, the USOP is a propylene-based terpolymer, such as propylene/butene/ethylene terpolymer.

The process includes contacting the seal layer of the first multilayer film the seal layer of a second multilayer film to form a seal area. The second multilayer film may be a component of a multilayer film that is the same as or different than the first multilayer film. The composition of the seal layer of the second multilayer film may be the same or different than the composition of the seal layer for the first multilayer film.

In an embodiment, the second multilayer film has the same material composition and structure as the first multilayer film.

The process further includes subjecting the seal area to (i) ultrasonic energy and (ii) a seal force from 2 N/mm, or 3 N/mm, or 4 N/mm to 5 N/mm, or 6 N/mm and forming an ultrasonic seal between the seal layers having a seal strength from 30 N/15 mm, or 31 N/15 mm, or 32 N/15 mm, or 33 N/15 mm, or 34 N/15 mm, or 35 N/15 mm, or 36 N/15 mm, or 37 N/15 mm, or 38 N/15 mm, or 39 N/15 mm, or 40 N/15 mm, or 45 N/15 mm, or 50 N/15 mm, or 55 N/15 mm, or 60 N/15 mm, or 65 N/15 mm, to 70 N/15 mm, or 75 N/15 mm, or 80 N/15 mm.

Nonlimiting examples of ultrasonic energy and seal force parameters are provided in Table A below. The subjecting step may include any combination of the parameters shown in Table A below.

TABLE A

| Ultrasonic energy | Seal force |
| --- | --- |
| 20, 30, 35, 40, or 70 kHz | 1-12 N/mm |
| Anvil: 2.5 millimeter (mm) radius | 2-6 N/mm |
| Horn width: 220 mm | 2-5 N/mm |
| Cycle: 200 millisecond (ms) sealing, 300 ms rest | 3-5 N/mm |
| Amplitude 10-50 microns | |
| Sample width: 100 mm | |

Applicant discovered polymeric materials fulfilling the requirements for a USOP (properties (a)-(d)) unexpectedly enable strong ultrasonic seal formation (30-80 N/mm) using minimal seal force (2-6 N/mm). Bounded by no particular theory, it is believed selection of USOPs with the aforementioned properties (a)-(d) synergistically minimizes the seal force required to produce suitable ultrasonic seals. Minimal seal force (2-6 N/mm) advantageously (i) reduces stress on the film polymers, (ii) reduces or eliminates damage to other film layers (such as barrier layers, for example), (iii) reduces or eliminates "squeeze out" of polymer from the seal area, and (iv) enables seal formation when contaminants are present in the seal area. Tailoring properties (a)-(d) to match a specific ultrasonic seal application, the present process advantageously increases production efficiencies by using less energy (minimizing load strength) and minimizing seal defects—each of which is advantageous during commercial-scale production of flexible pouches, as in FFS production, for example.

In an embodiment, the seal layer of the first multilayer film and the seal layer of the second multilayer film are the same material.

In an embodiment, the multilayer film is folded upon itself such that opposing seal layers face each other and form the seal area. In this embodiment, the first multilayer film is the first portion of the folded film and the second multilayer film is a second portion of the folded film that is folded upon itself. In other words, the second multilayer film is a portion of the multilayer film that is folded over and placed in opposing relation to the seal layer. The manipulation a single multilayer film to place portions of the same seal layer in opposing relation to each other in order to form a seal occurs in a form, fill, and seal packaging systems, for example.

In an embodiment, the film portions in the seal area are in contact with a horn and an anvil of an ultrasonic seal apparatus. The process includes moving the horn a distance from 0 microns, or greater than 0 microns, or 2 microns, or 5 microns to 10 microns, or 15 microns, or 20 microns during the forming step. Horn displacement during the sealing process can be measured with a laser sensor, for example. In this way, the present process advantageously reduces, or eliminates, horn displacement into the seal area during the ultrasonic sealing process.

In an embodiment, the backing layer is poly(ethylene terephthalate) (or PET) and the seal layer is a monolayer and includes a USOP. The USOP present in the seal layer is selected from a ULDPE and a POP. The process includes subjecting the seal area to ultrasonic energy and a seal force from 4 N/mm to 6 N/mm, or 4 N/mm, and forming an ultrasonic seal having a seal strength from 37 N/mm to 55 N/mm.

In an embodiment, the backing layer is BOPP and the seal layer is a monolayer and includes a USOP selected from a ULDPE, a PBPE, and a POP. The process includes subjecting the seal area to ultrasonic energy and a seal force from 3 N/mm to 6 N/mm or 4 N/mm; and forming an ultrasonic seal having a seal strength from 55 N/15 mm to 80 N/15 mm.

In an embodiment, the seal layer includes a coextruded structure. The coextruded structure includes a face layer, a core layer, and an inner layer. The backing layer is laminated to the coextruded structure. This forms a multilayer film with the following layer structure: backing/adhesive/inner/core/face. The face layer is the contact layer. The inner layer is located between the backing layer and the core layer. The core layer includes a USOP selected from a ULDPE, a PBPE and a POP. The process includes subjecting the seal area to ultrasonic energy and 4 N/mm seal force and forming an ultrasonic seal having a seal strength from 35 N/mm to 55 N/mm.

In an embodiment, the seal includes the coextruded structure. The coextruded structure includes the face layer, the core layer, and the inner layer. The core layer and optionally the inner layer include a USOP. The face layer is void of USOP. The process includes forming an ultrasonic seal having a seal strength from 35 N/mm to 50 N/mm. With proper selection of the USOP, the present process advantageously enables placement of the USOP in one of the coextruded layers that is not the face layer. Applicant unexpectedly discovered selection of a USOP with properties (a)-(d) does not require the USOP to be present in the face layer to produce strong ultrasonic seals (30-80 N/mm).

2. Blends

Any layer in the first multilayer film and the second multilayer film may be a blend of two or more components.

In an embodiment, the multilayer film includes the coextruded structure that is the seal layer. The core layer and optionally the inner layer includes a blend of low density polyethylene and USOP. The face layer is void of LDPE. The term "low density polyethylene or "LDPE" is a polyethylene made in an autoclave or in a high pressure polymerization process, such as a tubular high pressure polymerization process. In a further embodiment, the LDPE excludes linear low density polyethylene and high density polyethylene. The LDPE has a melt index (MI) from 0.2 g/10 min, or 0.5 g/10 min to 10 g/10 min, or 20 g/10 min, or 50 g/10 min.

The LDPE has a density from 0.915 g/cc, to 0.925 g/cc, or 0.930 g/cc, 0.935 g/cc, or 0.940 g/cc.

In an embodiment, the multilayer film includes a barrier layer. The barrier layer is an inner layer located between the backing layer and the seal layer. Suitable polymers for barrier layer include HDPE, LLDPE, LDPE, ethylene vinyl alcohol copolymer (EVOH), maleic anhydride-modified polyethylene, polyamide (PA), cyclic olefin copolymer (COC), ethylene vinyl acetate (EVA), propylene homopolymer (PP), and vinylidene chloride polymer, and combinations thereof.

In many commercial applications two ultrasonic sealable flexible films are used together such that the second multilayer film is superimposed on the first multilayer film so that the seal layer of the first multilayer film is in contact with the seal layer of the second multilayer film. In other applications a single multilayer film or a single sheet may be folded such that two surfaces of the same seal layer are in contact with each other.

The present process may comprise two or more embodiments disclosed herein.

3. Film Structure

The present process produces sealed film structures. In an embodiment, the process produces a film structure. The film structure includes a first multilayer film and a second multilayer film. Each multilayer film includes a backing layer and a seal layer. Each seal layer includes an ultrasonic sealable olefin-based polymer (USOP) having the following properties:

(a) a heat of melting, $\Delta H_m$, less than 130 J/g,
(b) a peak melting temperature, Tm, less than 125° C.,
(c) a storage modulus in shear (G') from 50 MPa to 500 MPa, and
(d) a loss modulus in shear (G") greater than 10 MPa.

The multilayer films arranged such that the seal layer of the first multilayer film is in contact with the seal layer of the second multilayer film. The seal layers form an ultrasonic seal having a seal strength from 30 N/15 mm to 80 N/15 mm when ultrasonically sealed at 4 N/mm seal force.

In an embodiment, when ultrasonically sealed at 4 N/mm, the seal layers form an ultrasonic seal having a seal strength from 30 N/15 mm, or 31 N/15 mm, or 32 N/15 mm, or 33 N/15 mm, or 34 N/15 mm, or 35 N/15 mm, or 36 N/15 mm, or 37 N/15 mm, or 38 N/15 mm, or 39 N/15 mm, or 40 N/15 mm, or 45 N/15 mm, or 50 N/15 mm, or 55 N/15 mm, or 60 N/15 mm, or 65 N/15 mm, to 70 N/15 mm, or 75 N/15 mm, or 80 N/15 mm.

In an embodiment, the backing layer of the film structure is a material selected from PET, polyamide, BOPP, metal foil, and combinations thereof.

In an embodiment, the USOP of the film structure is a material selected from PBPE, LLDPE, ULDPE, POP, and combinations thereof.

In an embodiment, the multilayer film includes a barrier layer.

In an embodiment, the first multilayer film and the second multilayer film are components of a single flexible sheet. The single flexible sheet is folded to superimpose the second multilayer film on the first multilayer film.

In an embodiment, film structure includes a multilayer film wherein the backing layer includes BOPP and the seal layer is a monolayer comprising a USOP selected from ULDPE, a POP and a PBPE. The seal layers form an ultrasonic seal having a seal strength from 55 N/15 mm to 80 N/15 mm when ultrasonically sealed at 4 N/mm seal force.

In an embodiment, the film structure includes a multilayer film wherein the backing layer is PET and the seal layer is a monolayer comprising a USOP selected from a ULDPE, a POP, and a PBPE. The seal layers form an ultrasonic seal having a seal strength from 37 N/15 mm to 55 N/15 mm when ultrasonically sealed at 4 N/mm seal force.

In an embodiment, the film structure includes a multilayer film wherein the seal layer is a coextruded structure including a face layer, a core layer, and an inner layer. The face layer includes a USOP selected from a ULDPE, a POP, and a PBPE. The seal layers form an ultrasonic seal having a seal strength from 35 N/15 mm to 55 N/15 mm when ultrasonically sealed at 4 N/mm seal force.

In an embodiment, the film structure includes a multilayer film wherein the seal layer is a coextruded structure including a face layer, a core layer, and an inner layer. At least one of the core layer and the inner layer includes a USOP selected from a ULDPE, a POP, and a PBPE. The face layer is void of a USOP. The seal layers form an ultrasonic seal having a seal strength from 35 N/15 mm to 50 N/15 mm when ultrasonically sealed at 4 N/mm seal force.

In an embodiment, the film structure includes a multilayer film wherein the second multilayer film is superimposed on the first multilayer film to form a common peripheral edge. The ultrasonic seal is located along the common peripheral edge.

In an embodiment, the ultrasonic seal is a hard seal.

In an embodiment, the ultrasonic seal is a frangible seal.

In an embodiment, the present disclosure includes a flexible container including the present film structure. Nonlimiting examples of suitable flexible containers include a pouch, a sachet, a stand-up pouch, and a form-fill-and seal pouch.

The present film structure may comprise two or more embodiments disclosed herein.

4. Flexible Container

The present process produces flexible containers. In an embodiment, the flexible container includes a first multilayer film and a second multilayer film. Each multilayer film includes a backing layer and a seal layer. The seal layer includes an ultrasonic sealable olefin-based polymer (USOP) having the following properties:
(a) a heat of melting, $\Delta Hm$, less than 130 J/g,
(b) a peak melting temperature, $Tm$, less than 125° C.,
(c) a storage modulus in shear ($G'$) from 50 MPa to 500 MPa, and
(d) a loss modulus in shear ($G''$) greater than 10 MPa.

The multilayer films are arranged such that the seal layer of each multilayer film is in contact with each other and the second multilayer film is superimposed on the first multilayer film to form a common peripheral edge. The flexible container includes a 2-fold zone and a 4-fold zone. The 2-fold zone and the 4-fold zone each form an ultrasonic seal having a seal strength from 30 N/15 mm to 80 N/15 mm when the zones are ultrasonically sealed at 4 N/mm seal force.

In an embodiment, the 2-fold zone and the 4-fold zone are ultrasonically sealed at 4 N/mm and form an ultrasonic seal having a seal strength from 30 N/15 mm, or 31 N/15 mm, or 32 N/15 mm, or 33 N/15 mm, or 34 N/15 mm, or 35 N/15 mm, or 36 N/15 mm, or 37 N/15 mm, or 38 N/15 mm, or 39 N/15 mm, or 40 N/15 mm, or 45 N/15 mm, or 50 N/15 mm, or 55 N/15 mm, or 60 N/15 mm, or 65 N/15 mm, to 70 N/15 mm, or 75 N/15 mm, or 80 N/15 mm.

In an embodiment, the 2-fold zone includes at least a portion of the common peripheral edge.

In an embodiment, the 4-fold zone includes at least a portion of a longitudinal seal.

In an embodiment, the multilayer film of the flexible container includes a backing layer that is selected from PET and BOPP.

In an embodiment, the flexible container includes a multilayer film wherein the seal layer is a monolayer and includes a USOP selected from the group consisting of ULDPE, POP, PBPE, and combinations thereof.

In an embodiment, the 2-fold zone is a gusset seal.

In an embodiment, the 4-fold zone is a cross-section fin seal.

Nonlimiting examples of suitable flexible containers include a pouch, a sachet, a stand-up pouch, and a form-fill-and seal pouch.

Nonlimiting examples of contents suitable for containment by the flexible container include comestibles (beverages, soups, cheeses, cereals, snacks, crackers, potato chips), liquids, shampoos, oils, waxes, emollients, lotions, moisturizers, medicaments, pastes, surfactants, gels, adhesives, suspensions, solutions, enzymes, soaps, cosmetics, liniments, flowable particulates, and combinations thereof.

The present flexible container may comprise two or more embodiments disclosed herein.

Definitions

Unless stated to the contrary, implicit from the context, or customary in the art, all parts and percents are based on weight, and all test methods are current as of the filing date of this disclosure.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "or", unless stated otherwise, refers to the listed members individually as well as in any combination.

The term, "ethylene-based polymer," as used herein, refers to a polymer that comprises, in polymerized form, a majority amount of ethylene monomer (based on the weight of the polymer), and optionally may comprise one or more comonomers.

The term, olefin-based polymer", as used herein, refers to a polymer that comprises, in polymerized form, a majority amount of olefin monomer, for example ethylene or propylene, (based on the weight of the polymer).

The term "propylene-based polymer," as used herein refers to a polymer that comprises, in polymerized form, a majority amount of propylene monomer (based on weight of the polymer), and optionally may comprise one or more comonomers.

The term "propylene/ethylene copolymer," as used herein, refers to a polymer that comprises, in polymerized form, a majority amount of propylene monomer (based on the weight of the polymer), and a minority amount of ethylene comonomer and optionally may comprise one or more additional comonomers.

Test Methods

Density is measured in accordance with ASTM D792.

DMTA (Dynamic Mechanical Thermal Analysis)

Samples are compression molded from granules at 185° C., and solidified at an average cooling rate of 10±5° C./min. Rectangular samples are cut out from molded sheets for measurements. Dynamic mechanical measurements in torsion are performed in a rotational rheometer ARES by TA Instruments in a range of temperatures from −100° C. to near the complete melting temperature of the sample. The temperature is raised in steps of 5° C. with a soak time per step of 120 seconds. Dynamic oscillatory deformation of 0.1% at a frequency of 10 rad/s is applied to a rectangular sample of 30 mm length, 12.7 mm width and 2.8 mm thickness. The measured torque is used to calculate the storage and loss shear modulus, G' and G", as a function of temperature.

Differential Scanning calorimetry (DSC)

Differential Scanning calorimetry (DSC) is used to measure melting and crystallization behavior of polymers (e.g., ethylene-based (PE) polymers). The sample is first melt pressed into a thin film at ca 175° C. and then cooled to room temperature. About 5 to 8 mg of polymer film sample is cut with a die punch and is weighed and placed into a DSC pan. The lid is crimped on the pan to ensure a closed atmosphere. The sample pan is placed into a calibrated DSC cell purged with nitrogen gas, and then heated at a rate of approximately 10° C./min, to a temperature of 180° C. for PE. The sample is kept at this temperature for three minutes. Then the sample is cooled at a rate of 10° C./min to −40° C. to record the crystallization trace, and kept isothermally at that temperature for three minutes. The sample is next reheated at a rate of 10° C./min, until complete melting and the resultant second melting trace is used to calculated heat of melting and melting temperature. The percent crystallinity is calculated by dividing the heat of melting ($H_m$), determined from the second heating curve, by a theoretical heat of fusion of 292 J/g for PE (165 J/g, for PP), and multiplying this quantity by 100 (for example, % cryst.=($H_m$/292 J/g)×100 (for PE)).

Unless otherwise stated, peak melting point ($T_m$) is determined from the second heating curve and corresponds to the temperature of the highest peak in the endotherm. The crystallization temperature ($T_c$) is determined from the cooling curve (peak Tc).

Melt flow rate, or MFR is measured in accordance with ASTM D 1238, Condition 230° C./2.16 kg.

Melt index, or MI, is measured in accordance with ASTM D 1238, Condition 190° C./2.16 kg.

Seal Strength

Sealing is performed with 100 mm wide samples by aligning the seal bar in the cross-direction of the constituent blown films. Three samples of 15 mm width are cut for measurement of seal strength. The procedure is repeated three times to get a total of nine specimens for seal strength testing. The seal strength is measured in accordance with DIN 55529. The rate of pull is 100 mm/minute for 50 mm long arms loaded in T-peel geometry Seal strength is determined from the maximum of the force elongation curve. The values reported are mean and standard deviation of seal strength for nine specimens.

Some embodiments of the present disclosure will now be described in detail in the following Examples.

EXAMPLES

1. Materials

Materials for inventive examples and comparative samples are provided in Table 1 below.

TABLE 1

| Commercial Name | Type | I2 (g/10 min) | Density (g/cm³) | Storage Modulus in Shear G' at 10° C. (MPa) | Loss Modulus in Shear G" at 10° C. (MPa) | ΔHm (J/g) | Tm (° C.) |
|---|---|---|---|---|---|---|---|
| DOWLEX 5056G | LLDPE | 1.0 | 0.919 | 242.3 | 19.7 | 143.5 | 119.6 |
| DOWLEX 2042G | LLDPE | 1.0 | 0.930 | 399.9 | 27.4 | 167.8 | 123.8 |
| DOWLEX 2740G | LLDPE | 1.0 | 0.940 | 593.5 | 31.9 | 178.1 | 127.8 |
| ATTANE SL4102G | LLDPE | 1.0 | 0.905 | 104.4 | 11.5 | 111.7 | 122.1 |
| ATTANE SL4100G | LLDPE | 1.0 | 0.912 | 144.7 | 14.2 | 127.2 | 116.6 |
| VERSIFY 2000 | Propylene copolymer 5% E | 2.0 | | 297.3 | 33.9 | 63 | 108.7 |
| AFFINITY PL1881G | Ethylene/octene POP | | 0.903 | 82.0 | 11.6 | 104.4 | 99.7 |
| PRIMACOR 1410 | EAA copolymer (9.7 wt % 10% AA) | 1.5 | N/A | 263.8 | 38.2 | 107.8 | 98.8 |
| Surlyn 1601 | Sodium ionomer | 1.3 | 0.94 | 153.1 | 11.8 | 73.2 | 96.1 |
| PB 0300M | Polybutene | 4.0 | 0.915 | 157.5 | 27.7 | 42.4 | 115.6 |
| Greenflex FD20 | EVA copolymer with 5 wt % VA | 0.5 | 0.924 | 145.7 | 18.1 | 128.1 | 102.7 |
| Terpolymer | Propylene/butane/ ethylene terpolymer | 7 (MFR) | 0.90 | 465.7 | 41.4 | 85.8 | 128.9 |

TABLE 1-continued

| Commercial Name | Type | I2 (g/10 min) | Density (g/cm³) | Storage Modulus in Shear G' at 10° C. (MPa) | Loss Modulus in Shear G" at 10° C. (MPa) | ΔHm (J/g) | Tm (° C.) |
|---|---|---|---|---|---|---|---|
| Dow LDPE 310E | LDPE (tubular) | 0.75 | 0.923 | | | | |
| TNS20 | BOPP | | | | | | |
| Hostaphan RN | PET | | | | | | |

Figure 1:
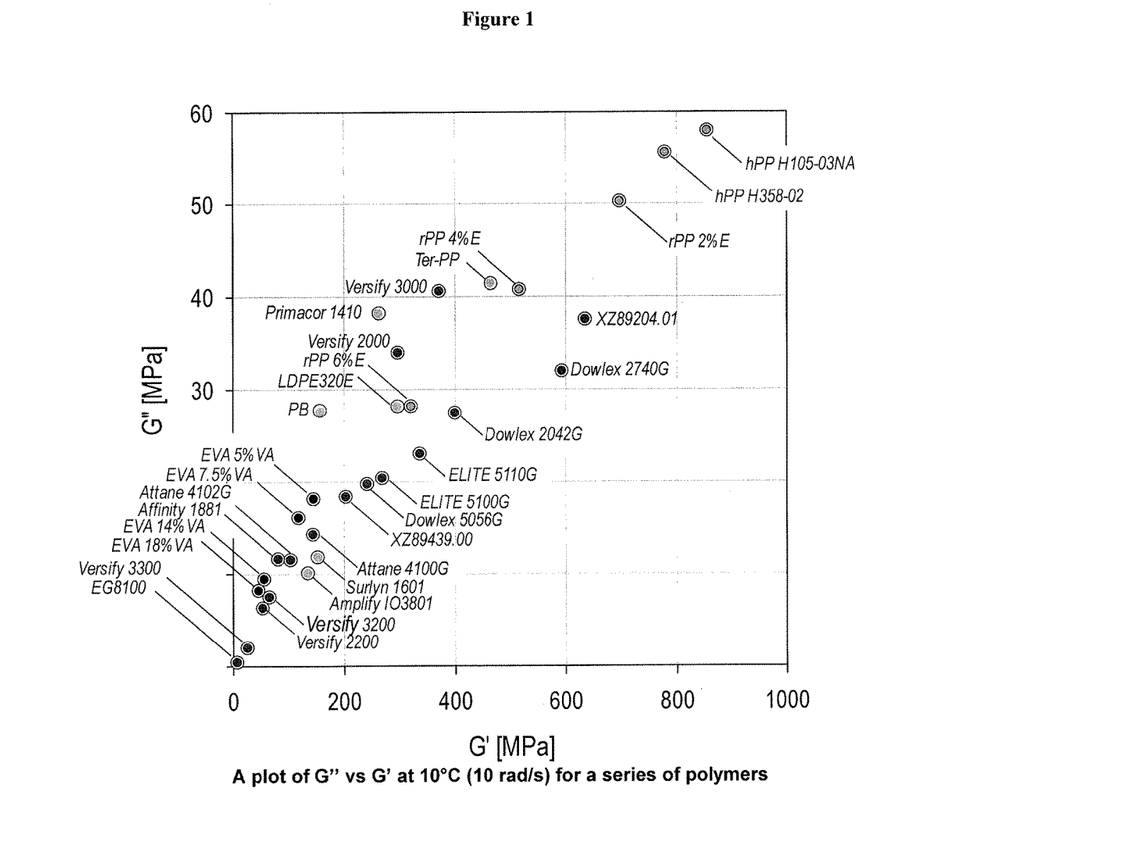
FIG. 1 a graph showing the plot of G' to G" in accordance with an embodiment of the present disclosure.

Dowlex, Attane, Affinity, Primacor, Versify are commercial product families made by The Dow Chemical Company.
Surlyn 1601 is a sodium ionomer supplied by DuPont.
PB0300M is a polybutene-1 resin from LyondellBasell Polymers.
Cosmoplene FL7641L is a polypropylene terpolymer from Polyolefin Company (Singapore) Pte Ltd.
Greenflex FD20 is an ethylene vinyl acetate copolymer (EVA) from Polimeri Europe of 5% VA content
TNS20 is BOPP from Taghleef Industries S.p.A., Italy
Hostaphon RN is PET from Puetz GmbH + Co Folien KG Germany FIG. 1 shows a plot of G' vs G" for several USOPs including the USOPs of Table 1.

Example 1

The seal layer may be a monolayer structure or a coextruded structure formed by blown film extrusion.
1. Monolayer blown films are prepared on a Covex blown film line with a 45 mm (28 L/D) extruder and a 150 mm diameter die. The die gap is 1.5 mm for LLDPE and ethylene copolymers, 1.0 mm for LDPE, and 2.0 mm for propylene copolymers. Films of 50 micron gauge are produced at 22.5 kg/h using a blow-up ratio of 2.5. The melt temperature is 220° C. The films are corona treated for 44 dynes surface tension.
2. Coextruded multilayer blown films are prepared on an Alpine line featuring two 50 mm skin extruders (30 L/D) and a 65 mm core layer extruder (30 L/D) and 200 mm diameter die equipped with internal bubble cooling. The die gap is 2.5 mm. Films of 50 micron gauge are produced at a total output rate of 115 kg/h, using a nominal thickness ratio of 1:3:1 for the three-layer structure. The blow-up ratio is 2.5 and the melt temperature is ca 230° C. The films are corona treated on the side of sealant for 44 dynes surface tension.

Multilayer films are produced by laminating a backing layer (12 micron PET layer or 20 micron BOPP layer) onto a 50 micron seal layer (either monolayer structure or coextruded structure). The backing layer is laminated to the seal layer using an adhesive layer. The lamination is oven-cured to completely cure the adhesive and form the ultrasonic sealable flexible film structures. When the seal layer is the coextruded structure, the multilayer film has the following layer configuration: Backing (12 or 20)/adhesive/inner (10)/core (30)/face (10), with thickness, microns, in parentheses).

Multilayer films are ultrasonically sealed under the conditions provided in Table 2 below.

Table 2 provides the ultrasonic seal conditions used to evaluate the multilayer films.

TABLE 2

| Ultrasonic Seal Conditions | |
|---|---|
| Equipment Conditions | Dialog Touch - Hermann Ultraschalltechnik GmbH |
| | 20 KHz, 220 mm horn width |
| | Anvil: 2.5 mm radius, stainless steel |
| | (also used for ultrasonic sealing curves) |
| | Cycle: 200 ms sealing-300 ms rest |
| | Oscillation: amplitude: 25 microns |
| | Sample width: 100 mm, sealed parallel to CD, |
| | 15 mm width samples cut |
| | Sealing force: 1 N/mm to 6 N/mm, 4 N/mm |
| | Multilayer films: 50 micron blown films |
| | (monolayer or coextruded), |
| | laminated to 12 micron PET or 20 micron BOPP |
| | Seal strength testing (DIN 55529) - rate of pull: 100 mm/min for 50 mm arms |

The seal layers of opposing multilayer films are placed into contact with each other and subjected to the ultrasonic seal conditions in Table 2 above.

Figure 2A:
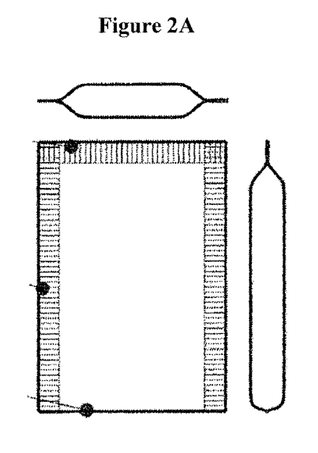
FIG. 2A is a schematic representation of a flexible container with a flat ultrasonic seal geometry in accordance with an embodiment of the present disclosure.
Figure 2B:
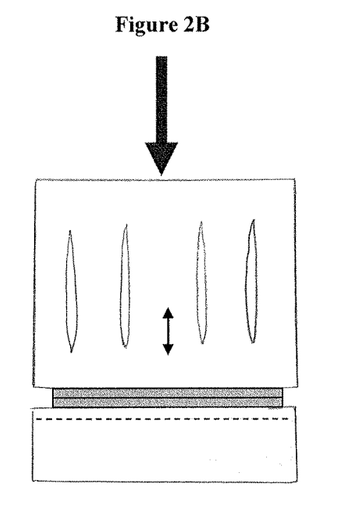
FIG. 2B is a schematic representation of ultrasonic sealing with a flat sealing geometry in accordance with an embodiment of the present disclosure.

FIG. 2A is a schematic representation of an ultrasonic seal produced with flat sealing geometry as schematically represented in FIG. 2B.

Figure 3A:
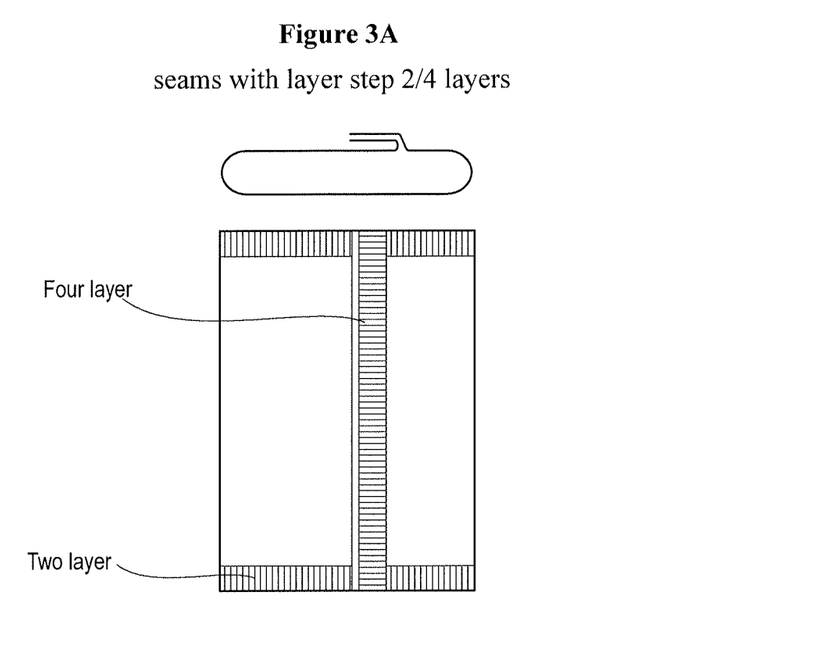
FIG. 3A is a schematic representation of a flexible container with a 2-fold zone and a 4-fold zone in accordance with an embodiment of the present disclosure.
Figure 3B:
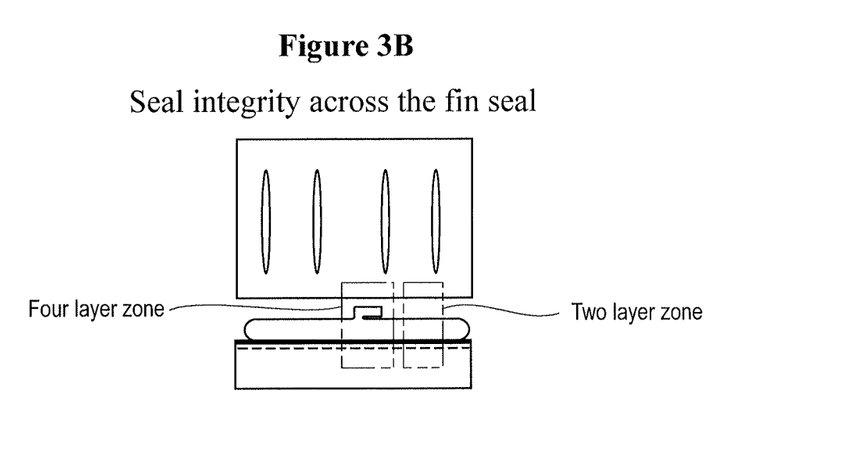
FIG. 3B is a schematic representation of ultrasonic sealing of a 2-fold zone and a 4-fold zone with a 2-fold/4-fold sealing geometry in accordance with an embodiment of the present disclosure.

FIG. 3A is a schematic representation of ultrasonic seals for 2-fold zones and 4-fold zones produced with 2-fold/4-fold sealing geometry as schematically represented in FIG. 3B.

Table 3 below provides properties for inventive ultrasonic heat seals and comparative samples.

TABLE 3

| Example | Backing | Film | Seal Geometry | Resin | PHSS | USS AT 4 N/mm Seal Force | Ratio USS/PHSS | USS PEAK | Ratio USSpeak/PHSS | USS Seal Force at Peak N/mm | USS Seal Force& |
|---|---|---|---|---|---|---|---|---|---|---|---|
| 1 | PET | mono | flat | dowlex2740 | 52 | 1.1** | 0.02 | 22.7 | 0.44 | 6 | 6 |
| 2 | PET | mono | flat | dowlex2042 | 50 | 4.4** | 0.09 | 26.6 | 0.53 | 6 | 5 |
| 3 | PET | mono | flat | dowlex5056 | 43 | 30.4 | 0.70 | 35.3 | 0.82 | 6 | 4 |
| 4 | PET | mono | flat | attane 4100 | 46 | 39.0 | 0.85 | 41.8 | 0.91 | 5 | 3 |
| 5 | PET | mono | flat | attane 4102 | 49 | 38.7 | 0.79 | 46 | 0.94 | 5 | 3 |
| 6 | PET | mono | flat | affinity 1881G | 40 | 43.1 | 1.06 | 43.1 | 1.06 | 4 | 2 |

TABLE 3-continued

| Example | Backing | Film | Seal Geometry | Resin | PHSS | USS AT 4 N/mm Seal Force | Ratio USS/PHSS | USS PEAK | Ratio USSpeak/ PHSS | USS Seal Force at Peak N/mm | USS Seal Force[&] |
|---|---|---|---|---|---|---|---|---|---|---|---|
| 7 | PET | mono | flat | versify2000 | 48 | 51.5 | 1.08 | 50.8 | 1.07 | 3 | 2 |
| 8 | PET | mono | flat | versify2200 | 40 | 49.7 | 1.25 | 49.7 | 1.25 | 4 | 2 |
| 9 | PET | mono | flat | surlyn1601 | 26 | 3.7** | 0.15 | 29.5 | 1.15 | 7 | 5 |
| 10 | PET | mono | flat | primacor1410 | 43 | 31.4 | 0.73 | 49.2 | 1.14 | 5 | 2 |
| 11 | PET | mono | flat | amplify io | 36 | 9.5** | 0.26 | 37.5 | 1.04 | 6 | 5 |
| 12 | PET | mono | flat | ldpe320 | 43 | 20.2** | 0.47 | 29.2 | 0.68 | 6 | 4 |
| 13 | BOPP | mono | flat | affinity 1881G | 82 | 70.7 | 0.86 | 70.7 | 0.86 | 4 | 3 |
| 14 | BOPP | mono | flat | attane 4102 | 77 | 75.4 | 0.98 | 75.4 | 0.98 | 4 | 2 |
| 15 | BOPP | mono | flat | versify2200 | 67 | 59.1 | 0.88 | 58.7 | 0.88 | 2 | 1 |
| 16 | PET | coex 1:3:1* | flat | affinity 1881G | 51 | 50.7 | 1.00 | 50.7 | 1.00 | 4 | 3 |
| 17 | PET | coex 1:3:1* | flat | attane 4102 | 46 | 45.7 | 1.00 | 45.7 | 1.00 | 4 | 3 |
| 18 | PET | coex 1:3:1* | flat | versify2200 | 50 | 19.6** | 0.39 | 38.9 | 0.78 | 6 | 4 |
| 19a | PET | mono | bag 2fold | dowlex5056 | 45 | 24.8** | 0.55 | 42.4 | 0.94 | 5 | 4 |
| 19b | | | bag 4fold | | 44 | 21.5** | 0.49 | 27.7 | 0.63 | 5 | 4 |
| 20a | PET | mono | bag 2fold | attane 4100 | 41 | 36.8 | 0.90 | 45.4 | 1.10 | 6 | 3 |
| 20b | | | bag 4fold | | 44 | 22.1** | 0.50 | 39.8 | 0.90 | 1 | 1 |
| 21a | PET | mono | bag 2fold | attane 4102 | 47 | 40.3 | 0.86 | 47.3 | 1.01 | 6 | 3 |
| 21b | | | bag 4fold | | 38 | 38.1 | 1.00 | 41.3 | 1.08 | 1 | 1 |
| 22a | PET | mono | bag 2fold | affinity 1881G | 40 | 43.9 | 1.11 | 43.9 | 1.11 | 4 | 3 |
| 22b | | | bag 4fold | | 35 | 36.4 | 1.04 | 39.2 | 1.12 | 3 | 3 |
| 23a | PET | mono | bag 2fold | versify2000 | 49 | 50.1 | 1.02 | 49.6 | 1.01 | 3 | 3 |
| 23b | | | bag 4fold | | 44 | 39.7 | 0.91 | 39.7 | 0.91 | 3 | 1 |
| 24a | PET | mono | bag 2fold | versify2200 | 30 | 39.9 | 1.32 | 39.9 | 1.32 | 4 | 3 |
| 24b | | | bag 4fold | | 35 | 47.2 | 1.36 | 47.2 | 1.36 | 4 | 1 |
| 25a | PET | Mono | bag 2fold | Primacor1410 | 45 | 28.9** | 0.64 | 41.4 | 0.92 | 6 | 3 |
| 25b | | | bag 4fold | | 49 | 24.7** | 0.51 | 34.3 | 0.70 | 2 | 1 |
| 26a | BOPP | mono | bag 2fold | affinity 1881G | 66 | 64.1 | 0.97 | 64.1 | 0.97 | 4 | 3 |
| 26b | | | bag 4fold | | 55 | 47.1 | 0.86 | 35.1 | 0.64 | 1 | 1 |
| 27a | BOPP | mono | bag 2fold | attane 4102 | 78 | 68.3 | 0.87 | 68.3 | 0.87 | 4 | 2 |
| 27b | | | bag 4fold | | 68 | 44.2 | 0.65 | 54.8 | 0.81 | 2 | 1 |
| 28a | BOPP | mono | bag 2fold | versify2200 | 74 | 78.9 | 1.06 | 79.6 | 1.07 | 3 | 2 |
| 28b | | | bag 4fold | | 75 | 52.1 | 0.69 | 69.7 | 0.93 | 1 | 1 |
| 29 | PET | coex 1:1:1[+] | flat | Dowlex 5056 | 53.2 | 28.8** | 0.54 | 42.1 | 0.79 | 5 | 4 |
| 30 | PET | coex 1:1:1[#] | flat | see footnotes | 52.2 | 42.5 | 0.81 | 49.4 | 0.95 | 5 | 3 |
| 31 | PET | coex 1:1:1[$] | flat | see footnotes | 53.8 | 38.8 | 0.72 | 38.8 | 0.72 | 4 | 3 |

EXPLANATIONS FOR COEX STRUCTURES:
*for examples 16, 17, 18: The face layer is shown in resin column F, the core layer and inner layer is: Dowlex 5056G + 20% LDPE 310E
[+]example 29: all layers are Dowlex 5056G
[#]example 30: face layer is Versify 2000 - the core layer and other skin layer are Dowlex 5056G
[$]example 31: face layer and inner layer are Dowlex 5056G, the core layer is Versify 2000
[&]USS seal force needed to obtain seal strength of 15 N/15 mm
**Comparative sample
PHSS—plateau heat seal strength determined in accordance with DIN 55529 (N/15 mm)
USS—Ultrasonic seal strength determined in accordance with DIN 55529 (N/15 mm)

Discussion

Figure 4:
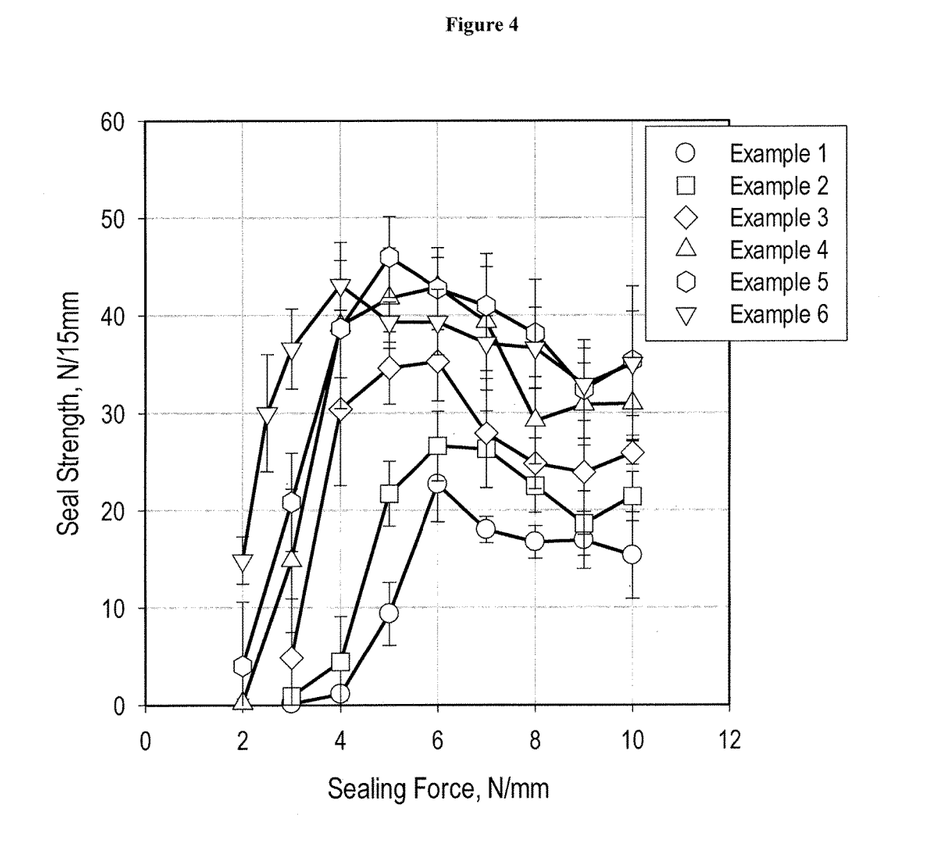
FIG. 4 shows graphs for ultrasonic seal strength vs. seal force for ultrasonically sealed film structures in accordance with embodiments of the present disclosure.
Figure 5:
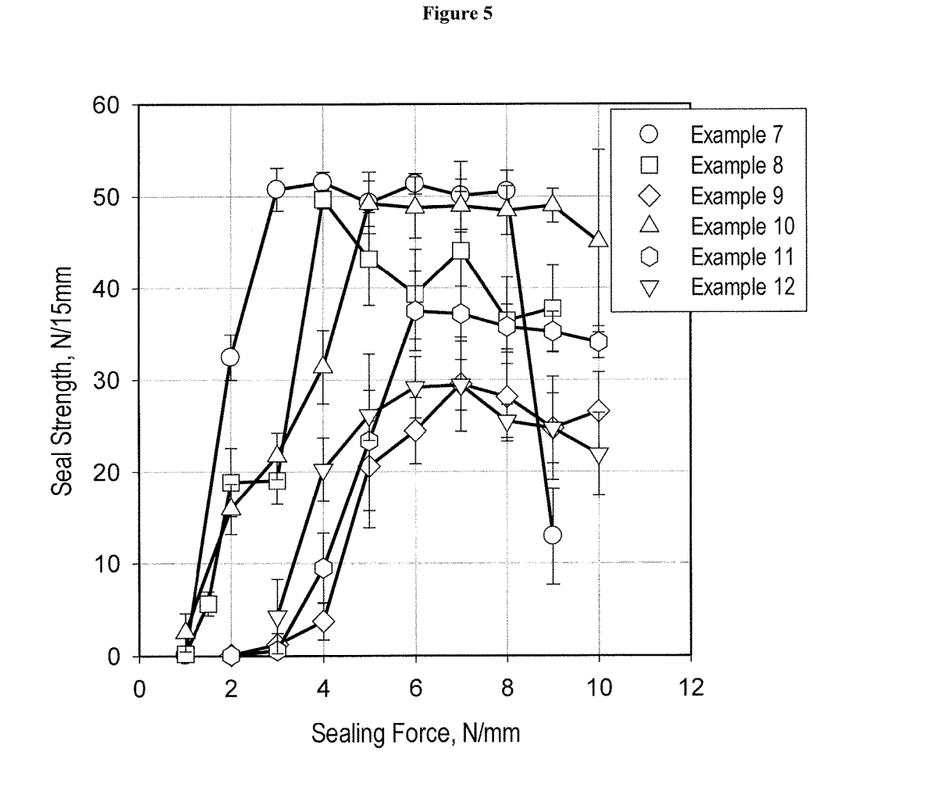
FIG. 5 shows graphs for ultrasonic seal strength vs. seal force for ultrasonically sealed film structures in accordance with embodiments of the present disclosure.
Figure 6:
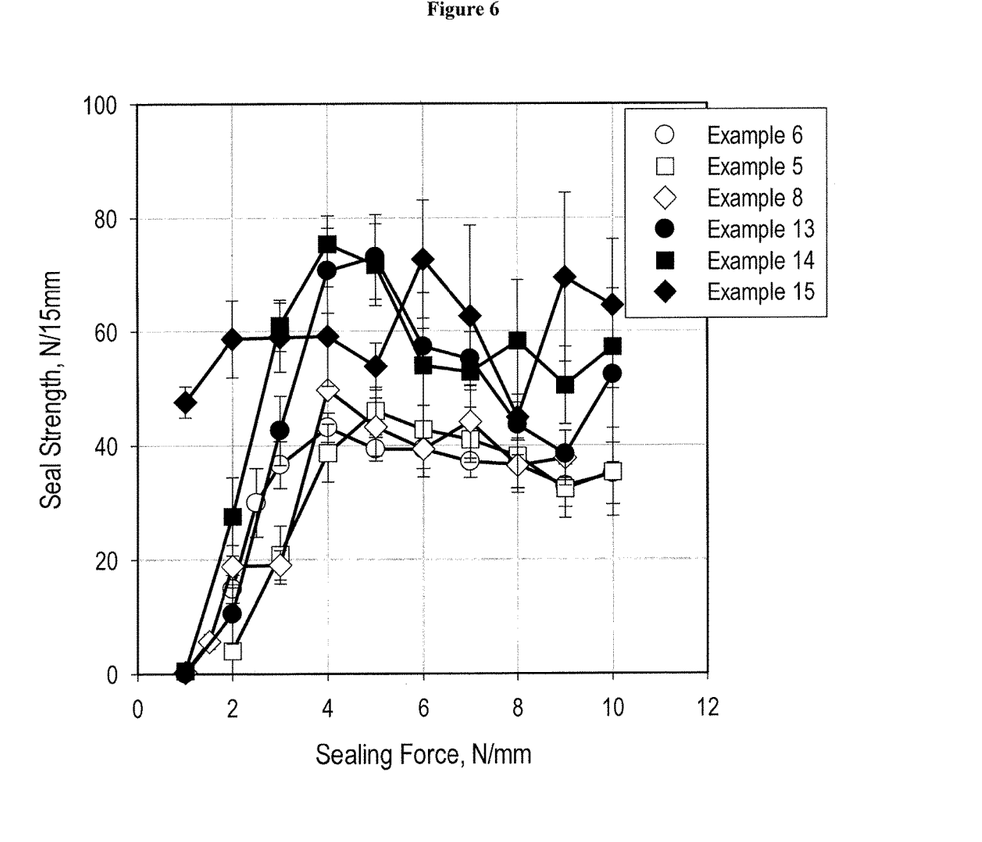
FIG. 6 shows graphs for ultrasonic seal strength vs. seal force for ultrasonically sealed film structures in accordance with embodiments of the present disclosure.

FIGS. 4-6 show ultrasonic seal strength (USS) v. seal force curves for multilayer films with monolayer seal layer and PET backing layer or BOPP backing layer.

Figure 7:
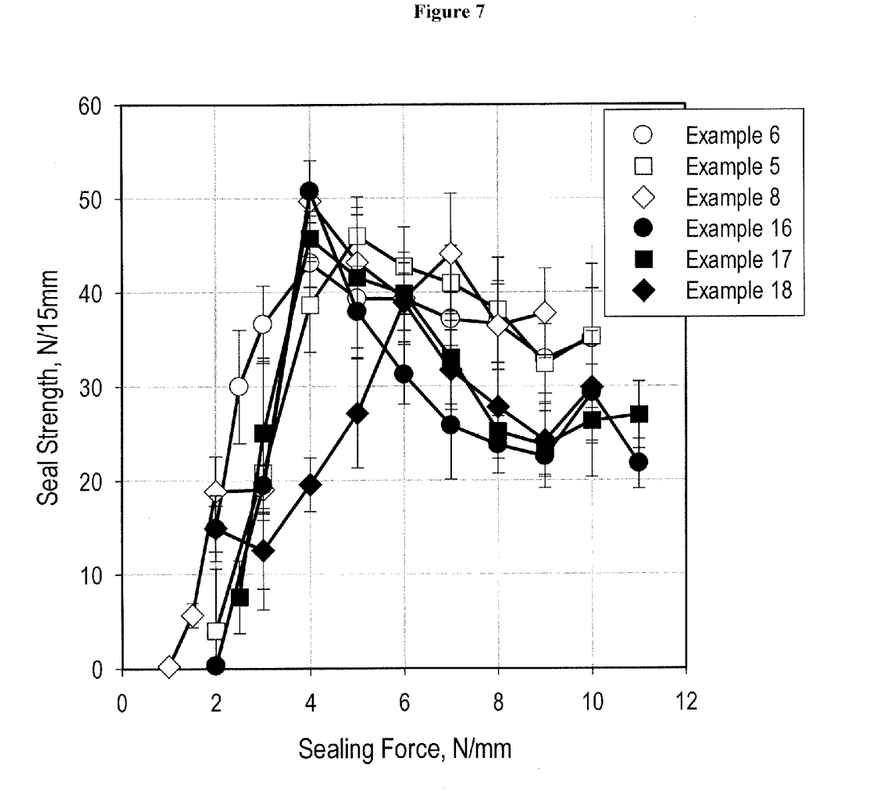
FIG. 7 shows graphs for ultrasonic seal strength vs. seal force for ultrasonically sealed film structures in accordance with embodiments of the present disclosure.

FIG. 7 shows USS v. seal force for monolayer seal layers and coextruded seal layers. The monolayer seal in Example 6 is the same as face layer in Example 16 (AFFINITY 1881G). The monolayer seal in Example 5 is the same as the face layer in Example 17 (ATTANE 4102). The monolayer in Example 8 is the same as the face layer in Example 18 (VERSIFY 2200).

Figure 8:
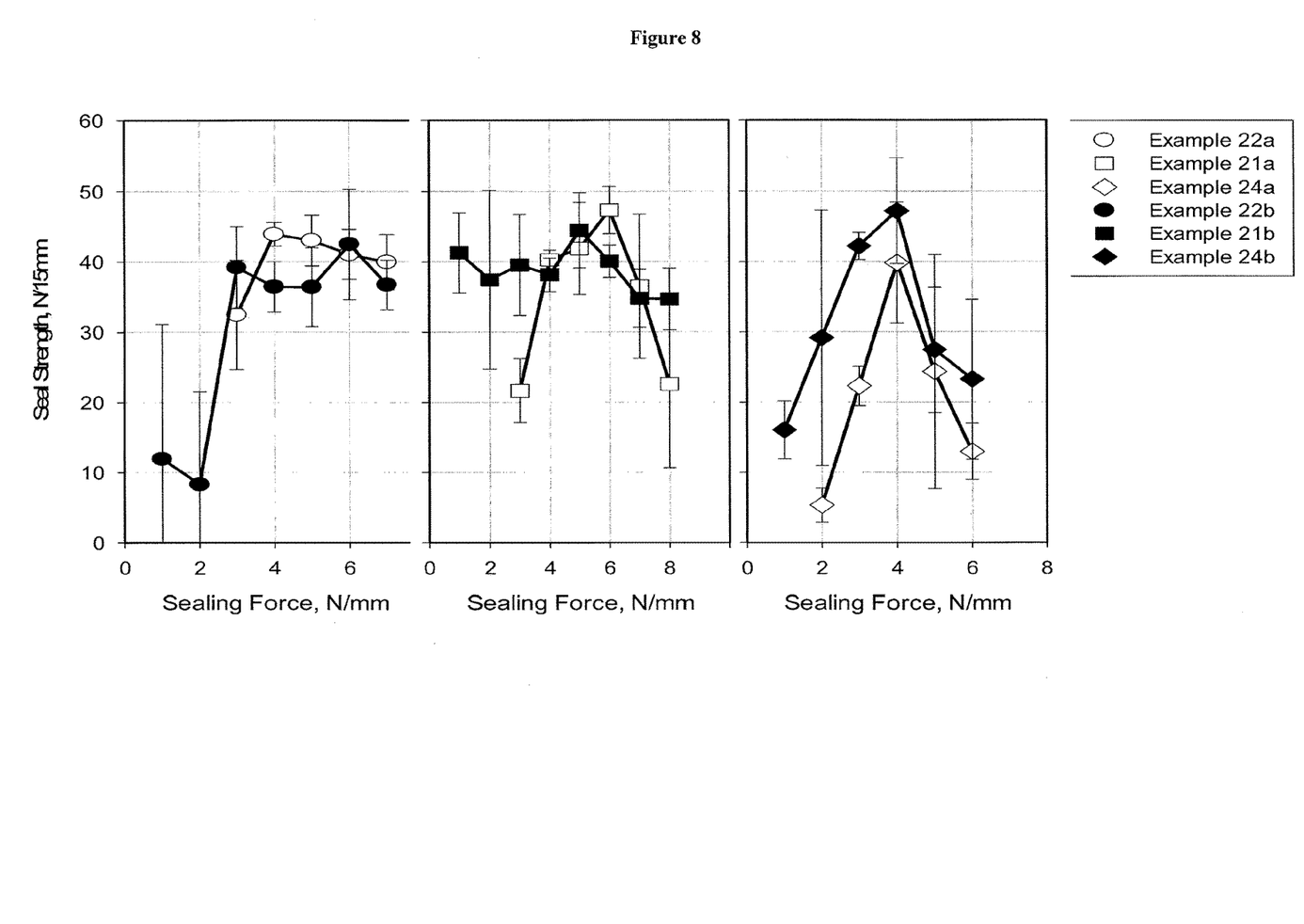
FIG. 8 shows graphs for ultrasonic seal strength vs. seal force for ultrasonically sealed film structures in accordance with embodiments of the present disclosure.

FIG. 8 shows USS v. seal force curves for ultrasonic seals made with 2-fold/4-fold sealing geometry.

A. Applicant discovered that the presence of a USOP in: (i) monolayer seal layer, (ii) face layer of coextruded seal layer, or (iii) core and/or inner layer of coextruded seal layer and void from face layer and a seal force produces an ultrasonic seal with a seal strength from 35-55 N/mm. In other words, the USOP does not need to be in the face layer to contribute to the production of strong ultrasonic seal.

B. Applicant discovered that when the USOP in the seal layer is tailored to the backing layer, the backing layer synergistically contributes to strengthened USS. When backing layer is BOPP, a seal force of 4-6 N/mm, or 4 N/mm produces an ultrasonic seal with a seal strength from 55 N/mm to 80 N/mm. With proper selection of the backing layer and the USOP, the layer contributes to the improvement in seal strength.

C. Applicant discovered that use of USOP in flexible film container with 2-fold zone and 4-fold zone and ultrasonically sealed with 4 N/mm seal force has a USS greater than 0.8 of the same 2-fold/4-fold seal that has been heat sealed (USS:PHSS ratio greater than 0.8).

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A film structure comprising:
   a first multilayer film and a second multilayer film, each multilayer film comprising a backing layer and a seal layer;
   each seal layer is a monolayer comprising an ultrasonic sealable olefin-based polymer (USOP) that is an ethylene/octene plastomer, the USOP having the following properties:

(a) a heat of melting, ΔHm, less than 130 J/g,
(b) a peak melting temperature, Tm, less than 125° C.,
(c) a storage modulus in shear (G') from 50 MPa to 500 MPa, as measured at a frequency of 10 rad/s at a temperature of 10° C., and
(d) a loss modulus in shear (G") greater than 10 MPa, as measured at a frequency of 10 rad/s at a temperature of 10° C.;

each backing layer comprises biaxially oriented polypropylene (BOPP);
the multilayer films arranged such that the seal layer of the first multilayer film is in contact with the seal layer of the second multilayer film; and
an ultrasonic seal between the seal layers, the ultrasonic seal having a seal strength from 31 N/15 mm to 80 N/15 mm.

2. The film structure of claim 1 wherein the ultrasonic seal has a seal strength from 55 N/15 mm to 80 N/15 mm.

3. The film structure of claim 1 wherein each seal layer is a coextruded structure comprising a face layer, a core layer, and an inner layer;
the face layer comprises the USOP that is an ethylene/octene plastomer; and
the ultrasonic seal has a seal strength from 35 N/15 mm to 55 N/15 mm.

4. The film structure of claim 1 wherein the USOP has
(a) a heat of melting, ΔHm, from 50 J/g to less than 130 J/g,
(b) a peak melting temperature, Tm, from greater than 90° C. to less than 125° C.,
(c) a storage modulus in shear (G') from 50 MPa to 350 MPa, as measured at a frequency of 10 rad/s at a temperature of 10° C., and
(d) a loss modulus in shear (G") from greater than 10 MPa to 40 MPa, as measured at a frequency of 10 rad/s at a temperature of 10° C.

5. A film structure comprising:
a first multilayer film and a second multilayer film, each multilayer film comprising a backing layer and a seal layer;
each seal layer is a monolayer comprising an ultrasonic sealable olefin-based polymer (USOP) that is an ethylene/octene plastomer, the USOP having the following properties:
(a) a heat of melting, ΔHm, less than 130 J/g,
(b) a peak melting temperature, Tm, less than 125° C.,
(c) a storage modulus in shear (G') from 50 MPa to 500 MPa, as measured at a frequency of 10 rad/s at a temperature of 10° C., and
(d) a loss modulus in shear (G") greater than 10 MPa, as measured at a frequency of 10 rad/s at a temperature of 10° C.;

each backing layer comprises poly(ethylene terephthalate) (PET);
the multilayer films arranged such that the seal layer of the first multilayer film is in contact with the seal layer of the second multilayer film; and
an ultrasonic seal between the seal layers, the ultrasonic seal having a seal strength from 35 N/15 mm to 70 N/15 mm.

6. The film structure of claim 5 wherein the ultrasonic seal has a seal strength from 37 N/15 mm to 55 N/15 mm.

7. The film structure of claim 5 wherein the second multilayer film is superimposed on the first multilayer film to form a common peripheral edge; and the ultrasonic seal is located along the common peripheral edge.

* * * * *